March 10, 1942. J. H. ROBERTSON 2,275,993
SELF-LOCKING NUT
Filed Sept. 5, 1939
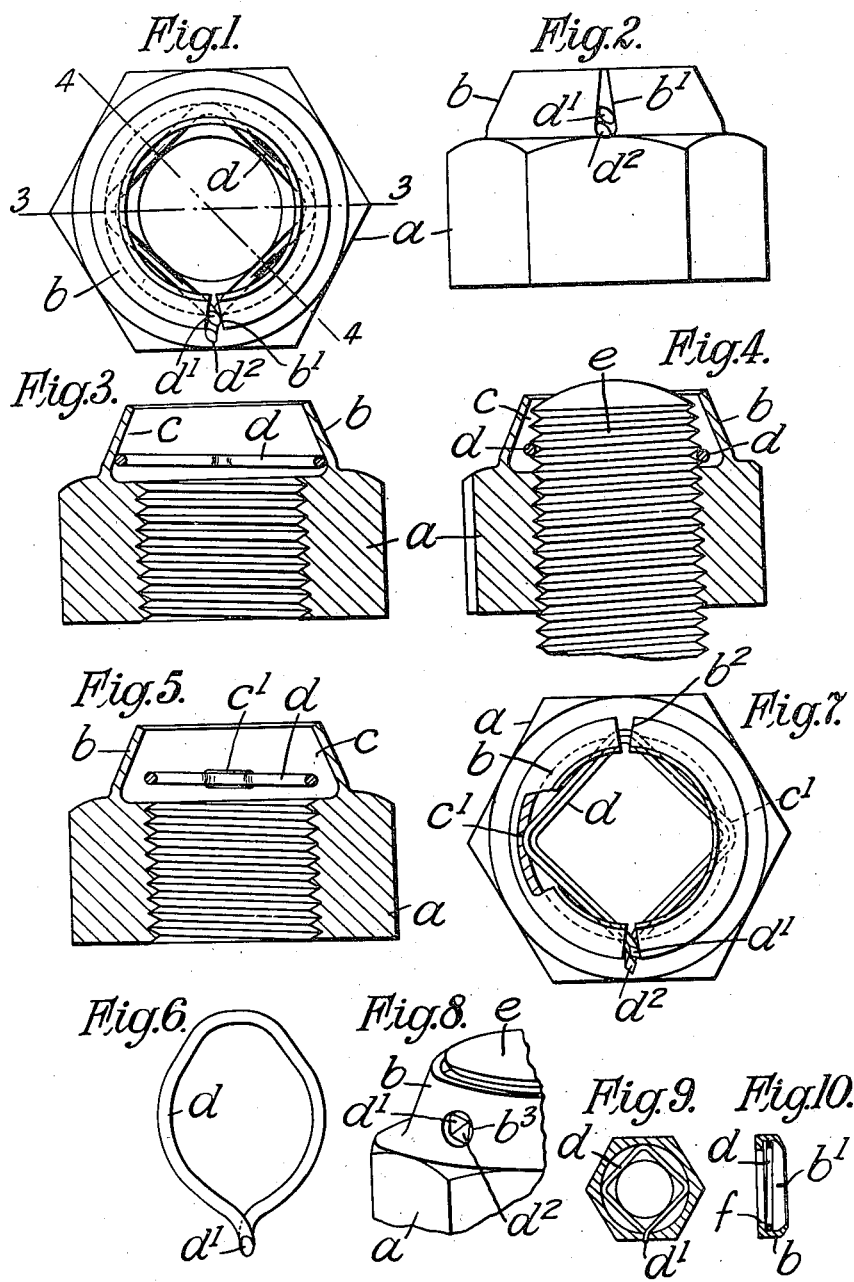
Inventor:
John H. Robertson,
By: Smith, Michael and Gardiner,
Attorneys.

Patented Mar. 10, 1942

2,275,993

UNITED STATES PATENT OFFICE 2,275,993

SELF-LOCKING NUT

John Hogg Robertson, London, England

Application September 5, 1939, Serial No. 293,499
In Great Britain September 6, 1938

3 Claims. (Cl. 151—25)

This invention relates to self-locking nuts of the kind carrying a coiled spring or the like flexible member adapted to engage frictionally with the thread of the bolt.

The invention has for its object the provision of a self-locking nut with progressive and non-wedging locking action, which is capable of frequent re-use, which cannot cause "scuffing" or disturbance of the screw thread and for which only standard tools are required.

The invention is hereafter described with reference to the annexed drawing, in which:

Fig. 1 is a plan view and Fig. 2 is a side elevation of the improved self-locking nut. Figs. 3 and 4 are sectional elevations on lines 3—3 and 4—4 of Fig. 1, respectively, the bolt being shown in Fig. 4. Fig. 5 is a sectional elevation of the nut with a spring member of another shape, and Fig. 6 shows the spring member of Fig. 5 detached. Fig. 7 is a plan view, part section, of the nut with a second slot in the crown. Fig. 8 is a fragmentary perspective view of a modification, in which the superposed extremities of the spring member are secured in a hole in the wall of the crown.

Figs. 9 and 10 are respectively a sectional plan and a sectional elevation of an attachment, according to this invention, for an ordinary nut.

The nut $a$ is screw-threaded internally to conform with the thread of bolt $e$ and is provided with a counterbored crown $b$ which is shown of cone-frustum shape thus forming an undercut recess $c$ for the spring member $d$. The crown $b$ is provided with at least one slot $b^1$ in its wall, said slot being shown parallel with the axis of the bolt hole. The said slot extends downwardly towards the body of the nut from the top edge of the crown $b$ so as to accommodate the overlapped extremities $d^1 d^2$ of the spring member $d$. At its top end, the edges of the slot are closed or brought towards one another to prevent the said extremities $d^1 d^2$ from leaving the slot. The spring-member $d$ is of non-circular shape and in Fig. 1 is shown as square-shaped in plan. The internal diameter of the recess $c$ is such as will cause the spring member $d$ to be tightly fitted therein, the angles, corners or bends of the spring member abutting against the inner face of the wall of the crown.

Resistance is thus provided at the points of contact between said corners and the crown so that the tendency of the spring member to move round with the bolt or to move in a radial direction is counteracted. The upper portion of the crown $b$ may be shaped from the cylindrical to the cone-frustum by a suitable die after the spring member has been inserted in position. A limitation is thus provided by the cone-frustum wall against upward movement of the spring member.

The screw-thread of the bolt $e$ progressively engages the four chord-like arms of the spring member $d$ and deforms said arms in arcuate fashion, the point of engagement of the thread with each arm being approximately midway of the length of the arm between adjacent corners or angles. The only surfaces which, apart from the normal screw thread, frictionally engage with the bolt thread are those which are in tension and spring-urged, the points which have the substantial support of the wall of the crown $b$ being continuously free from such contact. Thus by arranging the spring member $d$ in such a manner and making it of such a shape that its tensioned and thread-contacting surfaces are at the same distance from each other as the diametrical distance between the roots of the bolt thread, the said thread surmounts and traverses each side or surface of the spring member. At the same time, the thread exerts at the point of contact both a downward pressure and a radial pressure which deforms or bends that surface of the member $d$ until it conforms to the arcuate shape of that portion of the bolt thread.

The prevention of the movement of the spring member in an upward direction, viz., away from the body of the nut $a$, together with the provision of the overlapping extremities $d^1 d^2$ of the spring member, will ensure that the spring surfaces $d$ conform with the pitch of the thread and mate smoothly therewith so as to avoid wedging or "scuffing."

A progressive locking action is thus obtained, the said action gradually increasing as each chord-like arm is mated by the bolt thread until the optimum point is reached when all the sides or arms of the spring member $d$ are absorbed in the bolt thread.

A spring member $d$ of purely circular form would provide the lowest degree of efficiency so that I provide for the thread a greater length of tensioned frictional surfaces such as is afforded by an angular spring member of, for example, equilateral triangular or square shape in plan. This spring member $d$ may be approximately one coil of a helix corresponding with the pitch of the thread.

As shown in Figs. 5 and 6, the spring member $d$ may take the form of an oval or closed V, which is shaped to embrace the bolt $e$ on opposite sides and with two arms. This member $d$ is anchored to the wall of the recess $c$ in a bay $c^1$ located substantially opposite to the slot $b^1$ and the overlapping ends $d^1$ $d^2$ of the spring member. As contact with the bolt takes place, radial deformation of the two arms of the member $d$ will take place to the arcuate form, whilst upward or outward movement of the member $d$ is restricted by the bay $c^1$ and the retaining slot $b^1$.

If desired, the cone-frustum crown $b$ may be provided interiorly with one or more further bays or recesses in which the angles, corners or bends of the spring member $d$ will be seated. Thus in Fig. 7, I have shown the square-shaped spring member $d$, with its superposed extremities $d^1$ $d^2$ retained in slot $b^1$, with the opposite angle of the spring member $d$ engaging the sides of a second slot $b^2$ extending from the top of $b$ down to the body of the nut, and with the right and left hand corners of the spring member engaging bays $c^1$ in the wall of the crown $b$.

In this Fig. 7, the spring member $d$ is shown of square cross section whereas in Figs. 1 to 6 inclusive the member $d$ is shown of round-section wire. In Fig. 8, the wire of the spring member is of triangular cross-section and the juxtaposed extremities are retained in a hole or aperture $b^3$ through the wall of the cone-frustum crown $b$.

In the modification of Figs. 9 and 10, the invention is shown applied to a self-locking device suitable for use as an attachment to or in connection with an ordinary screw-threaded nut. The cone-frustum $b$ is flatter or shallower than in the previous construction shown. The wall of $b$ is inturned by flange $f$ and is provided with a plurality of slots $b^1$ $b^2$ . . . ., a four-armed spring member being housed in the chamber between flange $f$ and wall $b$.

The spring member $d$ may be made of spring steel or rustless metals or of metals covered with fibrous materials. The cross-section of the spring wire may be of such shape as is desired, but the more it conforms with the shape of the thread to be mated, the greater the area of frictional contact which will be effected.

In place of the spring wire member shown, I may employ a split annular member which has been drawn, stamped or pressed to match the form of the bolt thread for which it is intended and of any suitable degree of flexibility.

What I claim is:

1. A safety nut comprising a body screw-threaded internally to engage with the thread of a screw, an annular chamber at one end of said body, and a spring member housed in said chamber, said spring member consisting of a single coil of non-circular shape having a helical pitch substantially equal to the pitch of said screw-thread, the two extremities of said coil being anchored in a slot in a wall of said chamber, and intermediate portions of said coil providing resilient local contacts alternately with the interior of said chamber and with the thread of a screw engaged in the projecting portion of a screw engaged in said body.

2. A safety nut comprising a body screw-threaded internally to engage with the thread of a screw, a crown upon one end of said body, said crown providing an annular chamber substantially concentric with the screw-threaded interior of said body, and a spring member housed in said annular chamber, said spring member having overlapped ends and being of general polygonal shape and adapted to surround the projecting portion of a screw engaged in said body, the overlapped ends of said spring member being anchored to a wall of said chamber, polygon-angular portions of said spring member providing resilient local contacts with the interior of said chamber, and polygon-side portions of said spring member adapted to provide resilient local contacts with the thread of said projecting screw-portion.

3. A safety nut comprising a body screw-threaded internally to engage with the thread of a screw, an annular chamber at one end of said body, and a spring member housed in said chamber, said spring member being of substantially square configuration and adapted to surround the projecting portion of a screw engaged in said body, the ends of said spring member being overlapped and being anchored in a slot in the outer wall of said chamber, angular portions of said spring member engaging tightly in bays in said wall, and side portions of said spring member adapted to provide resilient local contacts with the thread of said projecting screw-portion.

JOHN HOGG ROBERTSON.